Jan. 19, 1971   J. F. JAMMET   3,556,861
METHOD OF MANUFACTURING ELECTROCHEMICAL GENERATORS
Filed Dec. 9, 1968   9 Sheets-Sheet 1

INVENTOR
JEAN FIRMIN JAMMET
BY
ATTORNEYS

Jan. 19, 1971  J. F. JAMMET  3,556,861
METHOD OF MANUFACTURING ELECTROCHEMICAL GENERATORS
Filed Dec. 9, 1968  9 Sheets-Sheet 4

INVENTOR
JEAN FIRMIN JAMMET
BY Tenyon & Tenyon
ATTORNEYS

United States Patent Office 3,556,861
Patented Jan. 19, 1971

3,556,861
METHOD OF MANUFACTURING ELECTRO-CHEMICAL GENERATORS
Jean Firmin Jammet, Poitiers, France, assignor to Societe des Accumulateurs Fixes et de Traction (Societe Anonyme), Seine-Saint-Denis, France, a company of France
Filed Dec. 9, 1968, Ser. No. 782,203
Claims priority, application France, Dec. 8, 1967, 131,624; Sept. 27, 1968, 168,043
Int. Cl. H01m 31/00, 33/00
U.S. Cl. 136—175                              15 Claims

ABSTRACT OF THE DISCLOSURE

Manufacture of electrochemical generators or cells, particularly of the alkaline type including a metallic cup preferably of zinc serving as a container as well as current collector involving providing oversize diametered cups on the inner wall of which a coherent mass of active material such as zinc or amalgamated zinc powder is adhered by delivering the powder in loose form into the oversize cup into which a mandrel is concentrically disposed, leaving an annular space defined by the inner wall of the cup and the mandrel. The powder is distributed into the annular space. Thereafter, prior to removal of the mandrel, this powder in said space is submitted to compression in situ by cold compression and dimensional reduction of the cup diameter to sufficient extent to effect adequate mechanical cohesion of the powder into an annular mass while retaining high porosity thereof and effecting its adherence to the inner wall of the reduced diametered cup. Subsequently, the mandrel is withdrawn and other components of the cell or generator including the opposite polarity electrode, depolarizer, separator and electrolyte are assembled with the so-treated cup-mass. Thereafter, additional cold compressional dimensional reduction of the cup and its contents may be effected to bring the positive and negative electrodes closer together and increase the electrochemical efficiency of the cell. A variety of modes of effecting cold compressioned dimensional reduction of the cup and distribution of the zinc powder into the annular space are described.

BRIEF SUMMARY OF INVENTION

This invention relates to electrochemical generators, more particularly alkaline cells of the type comprising a cylindrical metallic cup used as a container and as a current collector, in which the negative electrodes mainly made of zinc, for example, have a large active surface area with respect to weight is maintained in contact with said cup.

Such cells have been manufactured in the past by first producing a negative electrode comprising a metal cup and the negative active material, by depositing over the inner walls of the said cup as it rotates around its axis the said negative active material in the form of a powder made of zinc and starch, followed by heat treatment to provide a coherent deposit on the inner face of the cup.

The other components of the cell are then introduced in a second stage into the said negative electrode formed in the first-named procedure.

Such a method is obviously difficult to use for mass production since it requires several complex operations such as the deposition of a given amount of active material suspension along a given height of the cup and the heat curing of the said suspension in a fluid or pasty condition. This procedure also adds to production costs.

Objects and features of the present invention are to palliate these drawbacks.

Particular objects and features of this invention are a rapid, reliable and inexpensive procedure for making a negative electrode comprising a metal cup and active material adhered to its inner face as an annular porous coherent mass.

Further objects and features of this invention are the provision of process and apparatus for manufacturing an electrochemical generator, more particularly an alkaline cell of the type comprising a metal cup, preferably made of zinc, used as a container and as a current collector, characterized by the fact that in a first stage the active material which will constitute the negative electrode is distributed as a powder in an annular space delimited by the inner walls of the cup and a cylindrical mandrel coaxial with the said cup, then in a second stage before removing the mandrel the active material is submitted to a cold compression in situ in order to confer adequate mechanical cohesion thereto while maintaining its porosity at a high value. This cold compression may be effected by effecting cold compressive reduction in diameter of the metal cup after the powder has been distributed in said annular space while the mandrel remains in said cup, and thereafter withdrawing the mandrel resulting in a cup of reduced diametrical dimensions bearing on its inner side wall an adherent coherent porous mass of the initial powdered active material. This mass is in the form generally of an annulus.

The term "active material" is intended to embrace not only zinc powder but a powder, preferably dry, and containing all adjuvants required for satisfactory electrochemical operation. This includes an amalgamated dry zinc powder, for example, which can be the powder distributed into the annular space instead of plain zinc powder.

On the one hand, mechanical cohesion of this distributed powder is required since the annular mass structure of the negative active material that has been compressed in situ must be left unbroken during the subsequent removal of the mandrel, and, further, the resulting assembly of "cup-compressed material mass" intended to form one electrode must be handled thereafter without damage during subsequent manufacturing and assembly procedures to complete the electrochemical generator or cell. On the other hand, in such electrodes the coherent mass should remain preferably highly porous for easy flow of the electrolyte necessary to good electrochemical performance of the generator or cell of which they are to become a part.

According to one embodiment of the invention, the said compression in situ of active material is effected by reducing the diameter of the metal cup after the powder of such material has been distributed in the said annular space.

This reduction of diameter can be achieved according to this embodiment by a cold-compressing operation, in which the cup is forced either via the edges of its opening or from its bottom through a reducing die ring having a slightly smaller diameter than the original diameter of the cup after powdered active material has been distributed in the annular space. This cold-compressing operation is carried on in such a manner that the mandrel can be afterwards removed from a coherent assembly "cup-compressed active material mass."

The reduction of cup diameter can also be achieved according to this embodiment by exerting only a radial pressure on the vertical wall of the cup, either partially or completely of its length. Advantageously, the said radial pressure is constant and uniformly distributed. Alternatively, the pressure may be applied to the cup simultaneously in different zones to be reduced in diameter.

The fundamental difference between the two modes of these embodiments is the following:

In the first mode compression is effected at a constant pressure, i.e., whatever are particle sizes or specific gravity of active material, all successively manufactured cells are reduced to the same diameter by this operation, whilst, according to the second mode the compression is effected at a constant rate, hence all cells are not necessarily reduced to the same diameter after such operation. In fact, experiment shows that the variation in diameter is less than 0.1 mm. Nevertheless, such a variation is not a drawback since it may be corrected in a further cold-compressing operation.

Advantageously, the outer diameter of the mandrel used during the cold compression of either mode must be slightly larger than that of the assembled other components (carbon rod-depolarizing agglomerate-separator) required to complete the cell so that the assembly can be easily introduced into the cup-compressed active material mass after the mandrel has been removed.

After insertion of such assembled other components with addition of electrolyte as required and all other appropriate adjuvants, the process described in U.S. Pat. No. 3,040,117, can advantageously be used on the completed assembly. This process consists particularly in effecting a final cold-compressing operation on the cup of the assembly so that the positive and negative electrodes are brought nearer as it is desired, while they are still further cold-compressed. This enhances the efficiency of the electrochemical generator cell.

The process disclosed in the French Pat. No. 1,510,036 may also be used; this process comprises use at the same time of the effect of a cold-compressing operation and the effect of bulging of a material placed between the electrodes in order to avoid too great a final reduction in diameter.

Other objects and features of the invention will become apparent from the following specification and the accompanying drawings forming part hereof, wherein:

In all of the figures, the thickness of the zinc cup and powder mass and the magnitude of dimensional reduction resulting from cold compression as effected in practicing the invention have been exaggerated for clarification of the various modes of practicing the invention.

DETAILED DESCRIPTION

Figures 1, 2:
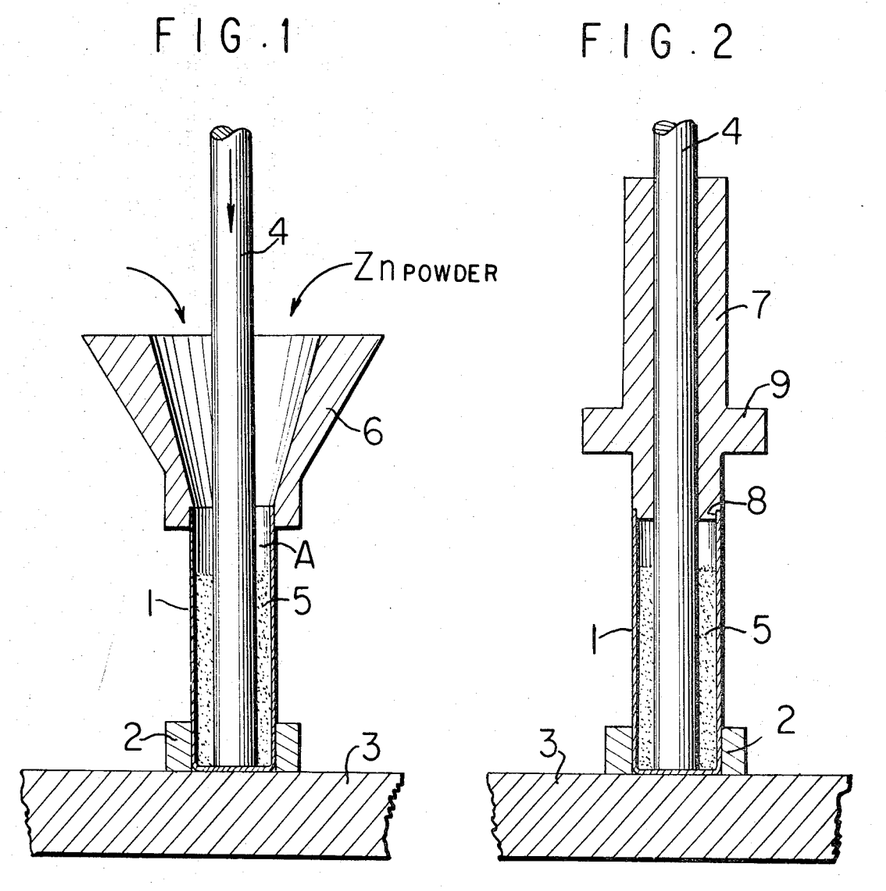
FIGS. 1–4 are diagrammatic cross sections of successive stages in one mode of practicing the invention.

Referring now to the drawings and first to FIGS. 1–4 inclusive, FIG. 1 illustrates a metallic cylindrical cup 1, for example, of zinc whose lower portion is seated in a ring 2 resting on the surface of a machine frame 3. The diameter of the cup 1 whose bottom is closed, is oversized with respect to the ultimately desired dimensions of cell or electrochemical generator of which it is intended to form the container as well as one of its current collectors. A reciprocally movable mandrel 4 of smaller diameter than the initial internal diameter of the cup 1 is coaxial with the axis of the cup 1 and is positioned so that its lower end rests on the inner bottom of cup 1 and delimits an annular space A with the inner cylindrical wall of cup 1. A concentrically disposed funnel-like hopper 6 temporarily surrounds the mandrel 4 and overlies the upper open end of cup 1. This hopper 6 serves to permit guided introduction into the annular space A of a powder 5 of zinc or amalgamated zinc so as to fill said annular space A to a selected level with a selected quantity of such powder. This filling may be enhanced if desired by effecting vibration of the hopper 6 in any desired way. Subsequent to such filling, the hopper 6 is removed and replaced on mandrel 4 by a sliding plug element 7 whose lower end 8 is machined to fit into the upper end of the cup 1 and thus close off the said upper end of said annular space A and fix the available volume for powder 5 therein. This sliding element 7 is provided with a shouldered portion 9 for purposes presently to be described.

Prior to the next step, the machine frame 3 is shifted as by rotation so that the cup 1 in ring 2 and bearing the inserted mandrel 4 and confined zinc powder in annular space A thereof closed off by a plug or slide element 7 becomes aligned axially with a reducing die ring member 10 mounted in the frame 3. The die ring 10 has its most restricted diameter equal to that desired to effect intended reduction in diameter of the cup 1 from its initial oversize dimensions when the cup is forced through it as will be described.

A movable counter pressure member or push rod 11 underlies the die ring 10, its upper end normally extending upwardly through the latter to lie flush with the upper surface of machine frame 3. The push rod 11 serves to engage and support the bottom surface of cup when it arrives over said die ring 10 and prevent its falling down into the tapered upper mouth of said die ring 10. This rod 11 also serves to prevent warping of the bottom of cup 1 as the cup is forced downwardly through said reducing die ring 10.

Figure 3:
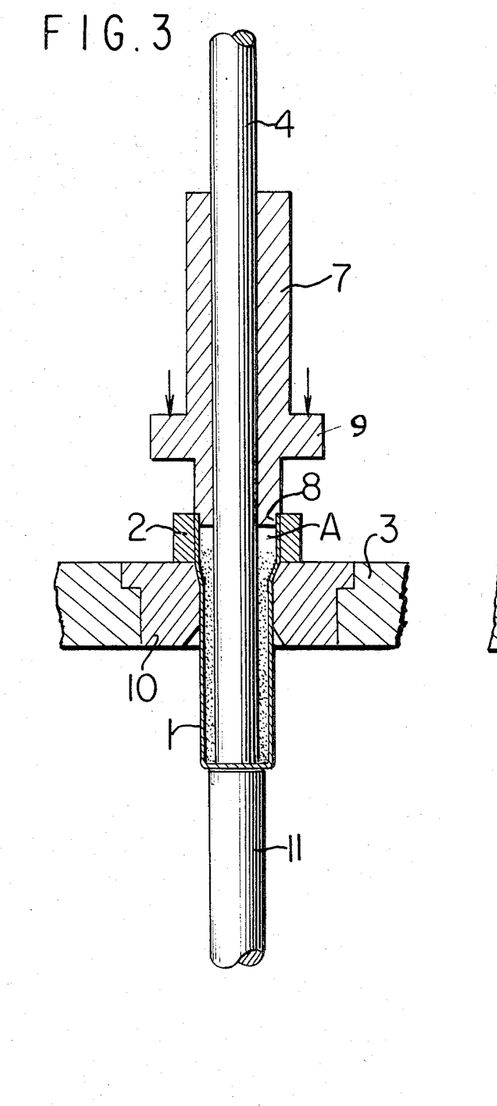

After such positioning of the cup 1 over die ring 10, downward pressure in the direction of the arrows shown in FIG. 3 is then exerted simultaneously on the mandrel 4 and sliding element 7 to force the cup 1 downwardly through the die ring 10 while maintaining the machined end 8 of plug element 7 in the upper end of cup 1 thereby effecting reduction in the diameter of cup 1 as is seen in FIG. 3 by cold compression. The downward movement of element 7 continues until its abutments 9 engage the upper surface of ring 2 at which time further forced downward movement of the mandrel 4 causes detachment or separation of the open end of cup 1 from the machined end 8 of said element and its passage entirely through the die ring 10 with consequent reduction in cup diameter as is seen in FIG. 4.

Figure 4:
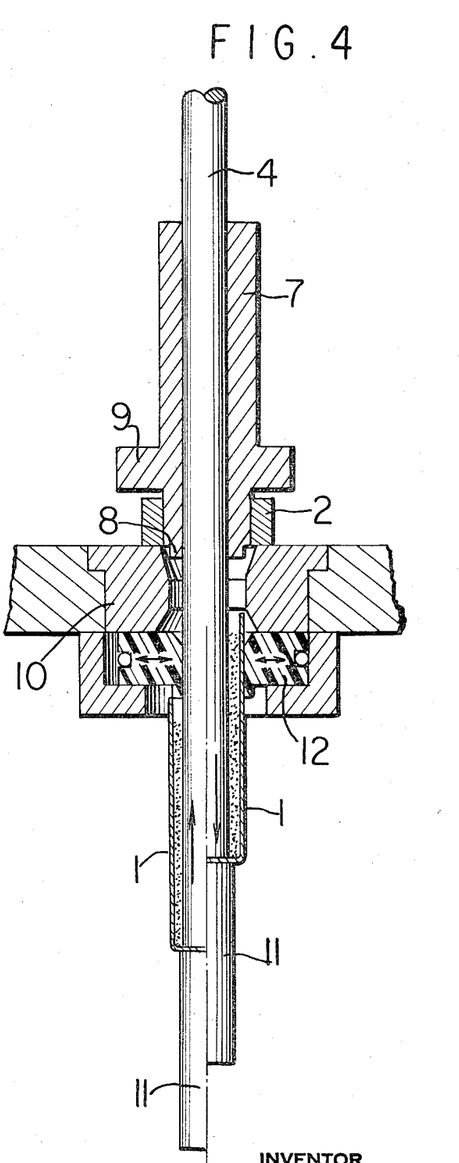

In addition, as seen in FIG. 4, an expandable ring 12 underlies the die ring 10 and in its transit through said die ring 10, the cup 1 is also forced through said ring 12 which yields radially during said transit first engaging the reduced side wall of the cup 1. Subsequently, when the upper end of said cup 1 has passed through ring 12 and underlies it, the ring 12 contacts into engagement with the surface of mandrel 4 over the upper end of cup 1. The mandrel 4 may then be retracted upwardly to remove it from the cup 1 and the powder 5 that has been compressed into a coherent annulus during the cold die compression and the dimensional reduction of the diameter of cup 1 in its transit through reducing die ring 10, said annulus now being coherent and adherent to the inner surface of said reduced diametered cup 1.

With the procedure described, a cup-active material mass assembly with well-defined dimensions, weight, coherency of the powder and porosity can thus be obtained.

Subsequent to completion of the cup-active material mass assembly the cold compression procedure hereinabove presented, the other components or adjuvants to complete the cell can be assembled with it as will be hereinafter described.

Figure 5:
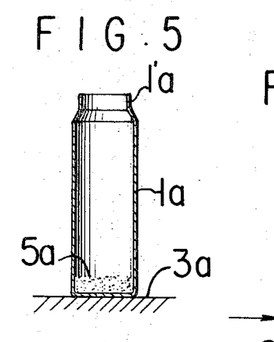
FIGS. 5–8 are diagrammatic cross sections of successive stages in a second mode of practicing the invention.

A second mode of preparing cup-active material mass assemblies in accord with the practice of this invention is illustrated in FIGS. 5–8 inclusive. Referring to these figures, the initially oversize diametered metallic cup 1a as seen in FIG. 5 of the same material as cup 1, has its open mouth region 1'a initially provided with a smaller diameter than its main cylindrical body portion, said region 1'a being equal substantially to the ultimately desired reduced diameter of the cold compressed cup-active material mass assembly. This is for the purposes of insuring good mechanical cohesion of the active powder material 5a to the inside of cup 1a.

Figure 6:
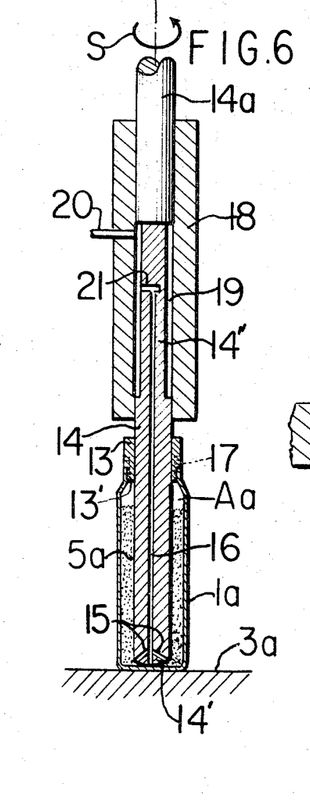

This cup 1a is first positioned on the upper surface of machine frame 3a with its bottom resting thereon. As a first step then, a selected quantity of powdered zinc or powdered amalgamated zinc 5a is introduced into the cup 1 to rest initially on its bottom as seen in FIG. 5. A plugging ring 13 of the same diameter as the external diameter of end 1'a of the cup 1a is then mounted on the open mouth end 1'a of cup 1, as seen in FIG. 6, it being provided with a machined portion 13' of reduced diameter to fit into the said open mouth 1'a to a limited depth therein. The said plugging ring 13 being of the same external diameter as that of the ultimately desired reduced diametrical dimensions of the cup 1a is then capable of transit through the reducing die ring 10a which like die ring 10 is carried by the movable machine frame 3a.

Subsequent to placement of ring 13 over the open mouth of cup 1a, a hollow mandrel 14 is introduced into cup 1a being passed through the ring plug 13 into the cup 1a and moved towards its bottom. This mandrel 14 has a slightly rounded lower end 14' and is provided with laterally extending channels or passageways 15 that communicate with a common central axial passageway 16 via which fluid or gas can be transmitted during downward motion of mandrel 14 so as to agitate and blow and distribute the powder 5a in cup 1a upwardly into the annular space Aa delimited between the inner side wall of the cup 1a and mandrel 14 until the rounded end 14' thereof reaches the bottom of said cup 1a.

This fluid or compressed gas puts the powder 5a into suspension and drives it upwardly into said annular space distributing it therein until the rounded end 14' reaches the bottom of said cup 1a at which time the said powder is substantially uniformly distributed in said annular space. Then, when such distribution has been effected, the fluid or compressed air supply is cut off. The plug 13 itself is provided with suitable means such as zig-zag channels or grooves 17 to permit the gas or fluid to escape while being of sufficiently small dimensions to prevent blowing out of powder particles therethrough. Advantageously, a spin of the mandrel in direction of arrow S or alternatively of cup 1a to effect a more uniform distribution of the blown powder particles into said annular space may be provided.

In order to direct fluid or compressed distributing air via mandrel 14, a sleeve 18 surrounds the mandrel 14 which has a reduced diametered portion 14'' to define an annular channel 19. The air or fluid may be introduced to this channel 19 as by a conduit 20 connected to a suitable source of supply and the channel 19 itself communicates with the axial passage 16 and passages 15 via a channel 21.

Figure 7:
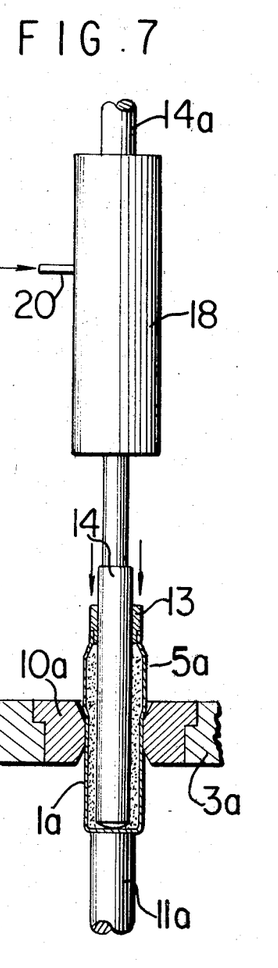
Figure 8:
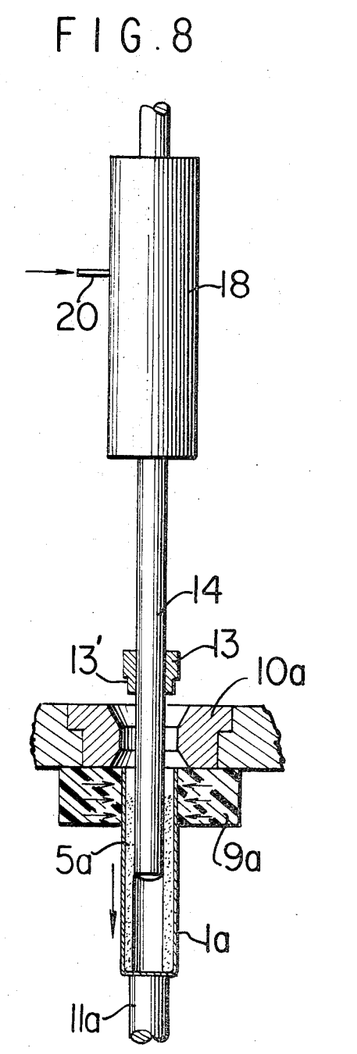

After such blown distribution of the powder 5a into the annular space Aa delimited by the cup 1a and mandrel 14 has been effected, the frame 3a is moved to a position such that the die ring 10a underlies the bottom end of cup 1a and the movable counter pressure push rod 11a then underlies the bottom of cup 1a at the level of the upper surface of machine frame 3a. Then the mandrel 14 is forced downwardly forcing cup 1a through the reducing die 10a which, during transit of the cup 1a therethrough cold compresses and reduces the diameter of said cup as seen in FIG. 7 causing the powder 5a distributed in the annular space Aa to become coherent and adherent to the inner wall of cup 1a as an annulus. The entire length of cup 1a is thereby reduced in diameter to that of its upper end 1'a, and moved completely through the reducing die ring 1a together with plug ring 13.

As in the case with the mode of FIGS. 1–4, an expandable ring 9a (FIG. 8) is located below the die ring 10a through which the reduced diametered cup 1a is also moved under downward action of mandrel 14. When the cup 1a has been driven out below the expandable ring 9a, the plug ring 13 is moved from the upper cup end and the mandrel 14 also retracted upwardly out of said cup in any suitable way. The expandable ring 9a can then be operated in any suitable way as by electromagnetic control to release the cup 1a as soon as the mandrel has been extracted therefrom.

The resultant coherent cup-active material mass assembly 5a is then like that obtained from the first-described mode of practicing the invention and its dimensional characteristics as well as weight can likewise be selected as needed and subsequently assembled with other requisite components or adjuvants as will be described to complete the cell.

A further mode of practicing the invention is illustrated in FIGS. 9–12.

In this embodiment, a reducing die ring 22 is carried by the machine frame 3b. A sleevelike plug 23 is mounted slidably on the hollow mandrel 14b and both extend downwardly through the reducing die ring 22, a shoulder 24 being provided to limit transit of the sleevelike plug 23 downwardly through the die ring 22. The external diameter of plug 23 is equal substantially to that of the narrowest diametered portion of die ring 22. Its lower end has a machined portion 25 of further reduced diameter for purposes presently to be described. The plug 23 and mandrel 14b are normally urged into the limiting position shown in FIG. 9 by appropriate means, such as springs or the like (not shown).

Figure 9:
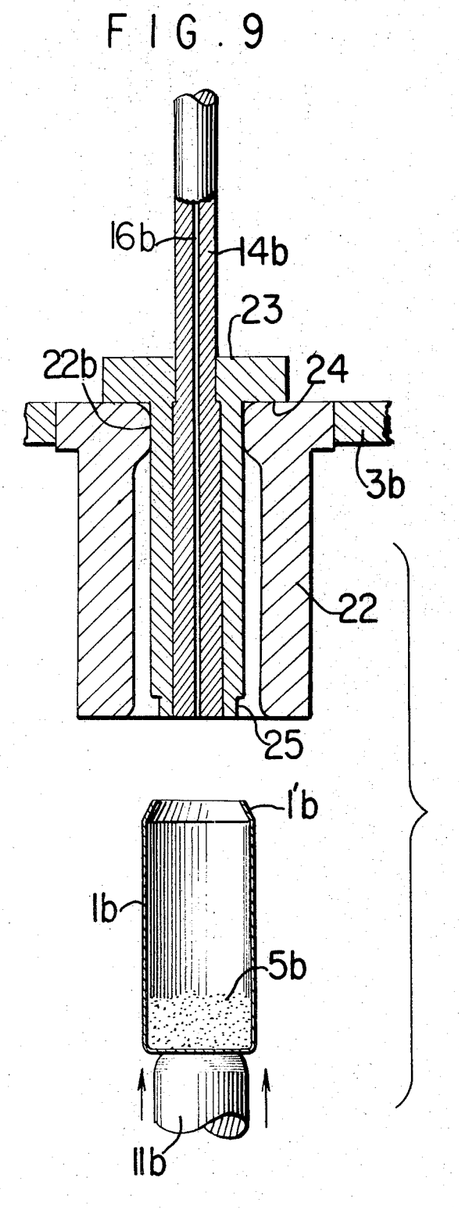
FIGS. 9–12 are diagrammatic cross sections of successive stages in a third mode of practicing the invention.

Appropriate means (not shown) similar to that of FIGS. 5–8, for introducing compressed air or fluid from a source into the channel 16b of the mandrel 14b in the position shown in FIG. 9 are provided. At this time, the plug 23 and mandrel 14b are positioned to receive the metallic cup 1b containing a measured quantity of the zinc or amalgamated zinc powder 5b. This cup 1b is positioned on the underlying counter push rod or piston 11b located below the die ring 22 and whose diameter is less than that of said ring 22 so that it can be moved upwardly freely therein.

As can be seen in FIG. 9, the upper open end 1'b of cup 1b is inturned so that it will fit over the machined lower end 25 of plug 23.

Figure 10:
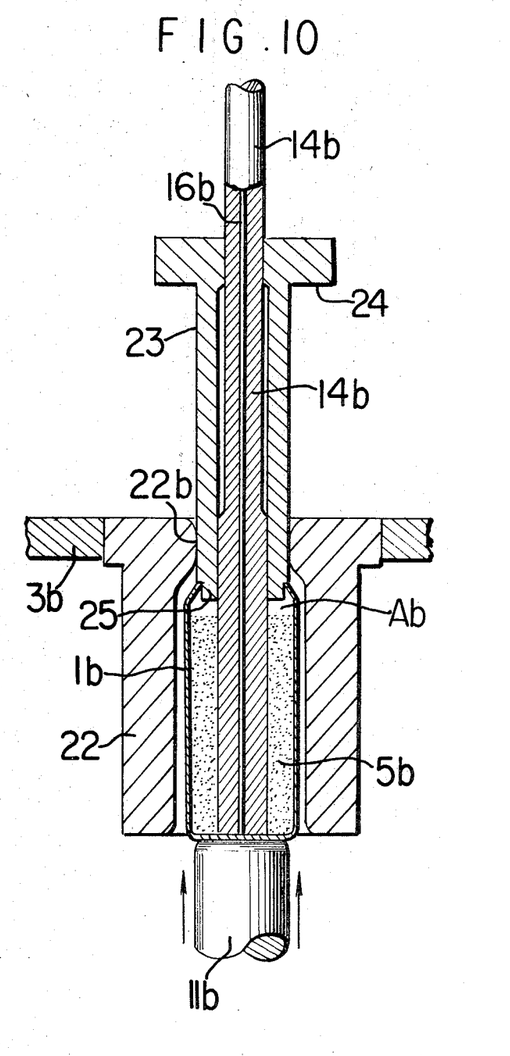

As the push rod or piston 11b then is forced upwardly it pushes the cup 1b upwardly into engagement with machined end 25 of said plug 23 and the latter slides upwardly on the mandrel 14b. During this rise, the fluid or compressed gas or air emerging from the bottom end of channel 16b of mandrel 14b agitates and drives the powder 5b away from the bottom of the cup 16 and distributes it uniformly in the annular space Ab delimited between the inner side wall of cup 1b and the surface of mandrel 14b (FIG. 10). The contact between the upper rim of cup 1b and the machined portion 25 of plug 23 is such that the compressed air or fluid can escape without escape of powder however.

When the rising piston 11b reaches the position shown in FIG. 10 where the bottom of the cup has come into contact with the lower end of mandrel 14b which in turn then starts to be pushed upwardly, the supply of compressed air or fluid is cut off in any suitable way.

Figure 11:
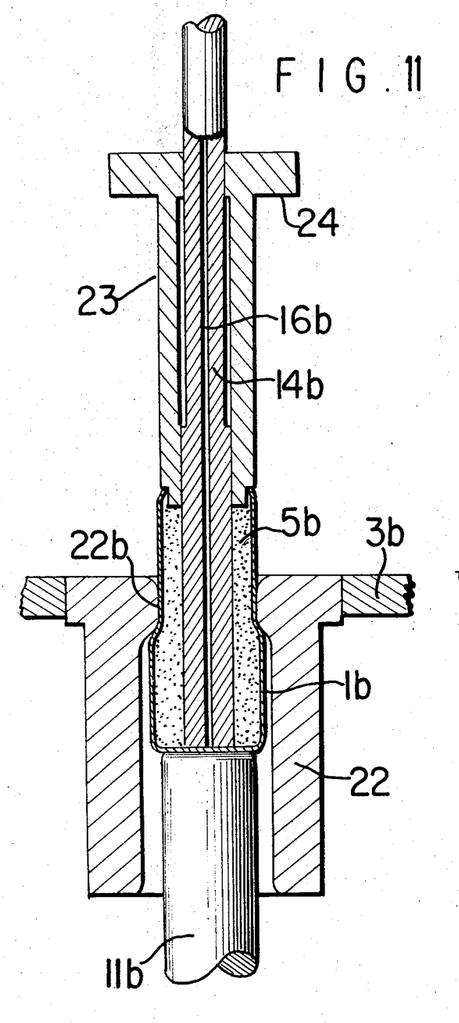
Figure 12:
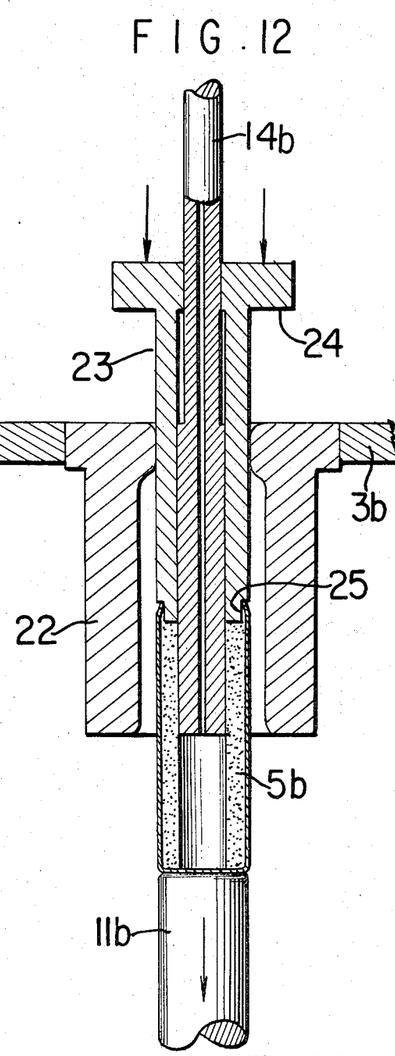

Further forced rise of the piston or push rod 11b forces the cup 1b and mandrel 14b upwardly through the reduced diametered portion 22b of the die ring 22 so that the diameter of cup 1b is thereby reduced as seen on an exaggerated scale in FIG. 11. During this rise of the cup 11b through said portion 22b of the die ring 22, the reduction in diameter of cup 1b thereby effected compresses the powdered active material 5b in the annular space A$b$ and agglomerates it into a coherent annular mass adhering to the inner side walls of the reduced diametered cup 1$b$.

When the upper end of rising push rod or piston 11$b$ has almost reached the upper level of the machine frame 3$b$, it again starts to move downwardly, suitable means (not shown) then also moving the plug 23 downwardly to force the now-reduced diametered cup 1$b$ downward through the die ring 22 through which said cup now passes freely. During this reverse transit the mandrel 14$b$ also moves downwardly at the same speed and remains within the cup. This mandrel motion, however, ceases at the position shown in FIG. 12 while the plug 23 has not yet reached its limiting downward position of FIG. 9 so that such plug can be further moved downwardly against the upper edges of the cup 1$b$ to cause the mandrel to be extracted from the then-reduced diameter cup 1$b$ which now constitutes a cup-negative active material mass assembly similar to those of the earlier described modes of practicing the invention. Here again, the dimensions of this assembly, weight and the like can be selected to meet desired requirements. Subsequently, cell completion can be effected as will be described.

A further mode of practicing the invention in which radial pressure is exerted against selected surface zones of the metallic cup is illustrated in FIGS. 13 to 16. In these figures, components having like numbers with the added subscript $c$ correspond to like numbered ones of the earlier described modes of practicing the invention.

Figure 13:
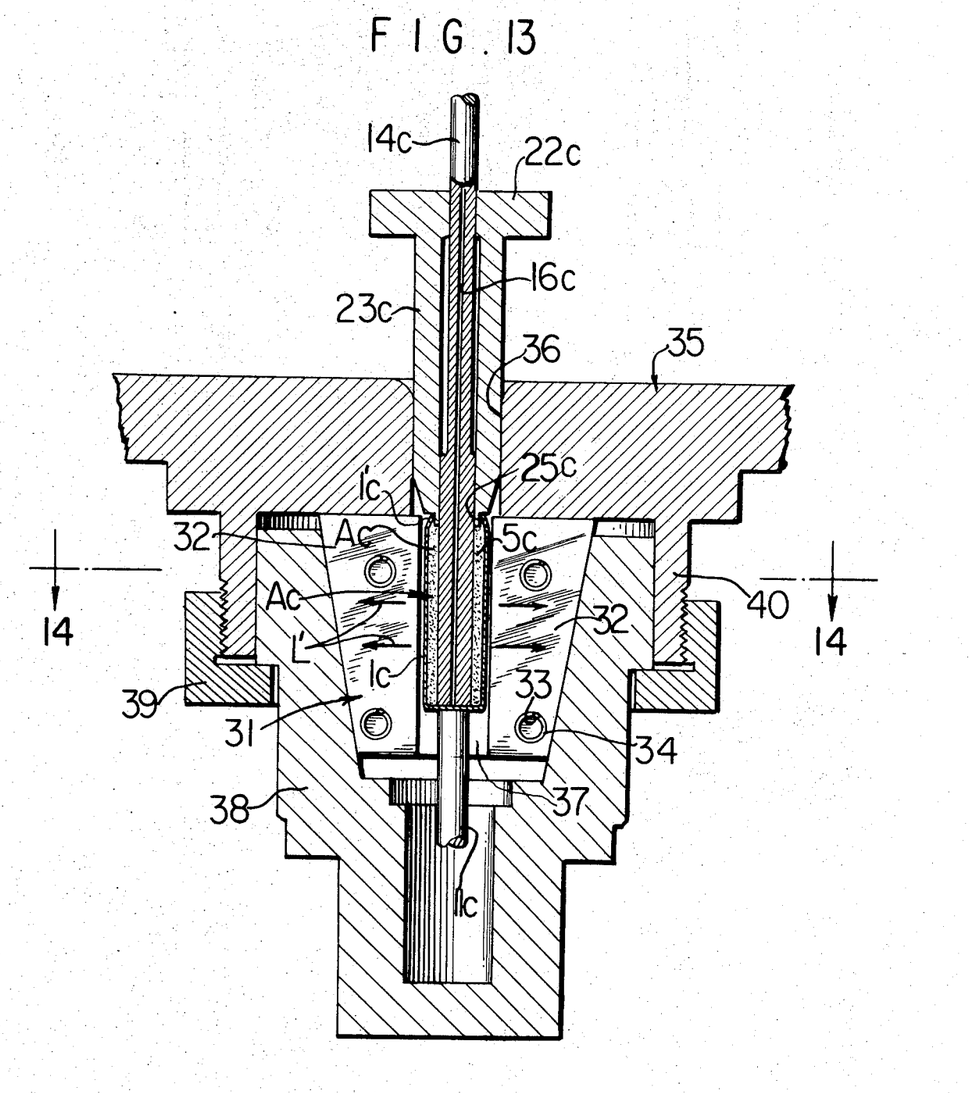
FIG. 13 is a diagrammatic cross section of a fourth mode of practicing the invention in a first stage thereof.
Figure 14:
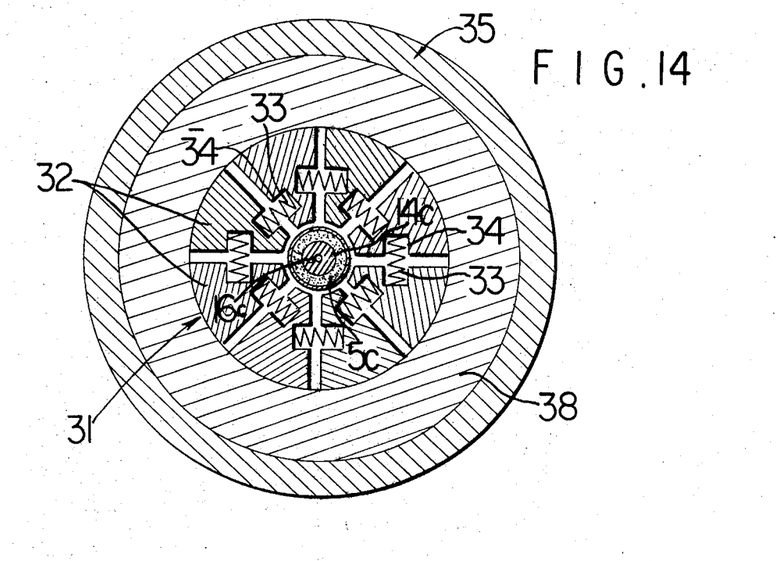
FIG. 14 is a section taken along the plane of lines 14—14 of FIG. 13.
Figure 15:
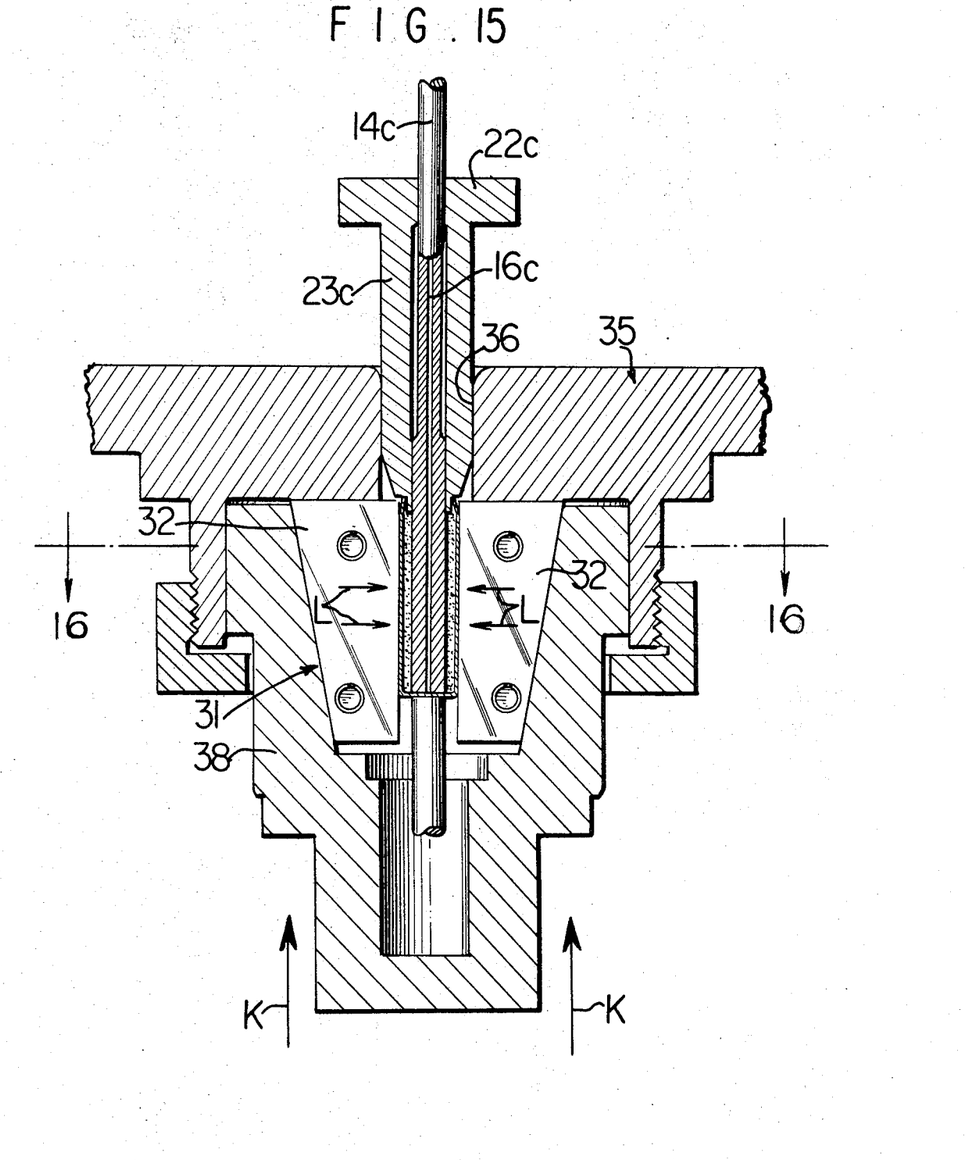
FIG. 15 is a diagrammatic cross section of the later stage of the fourth mode of practicing the invention.
Figure 16:
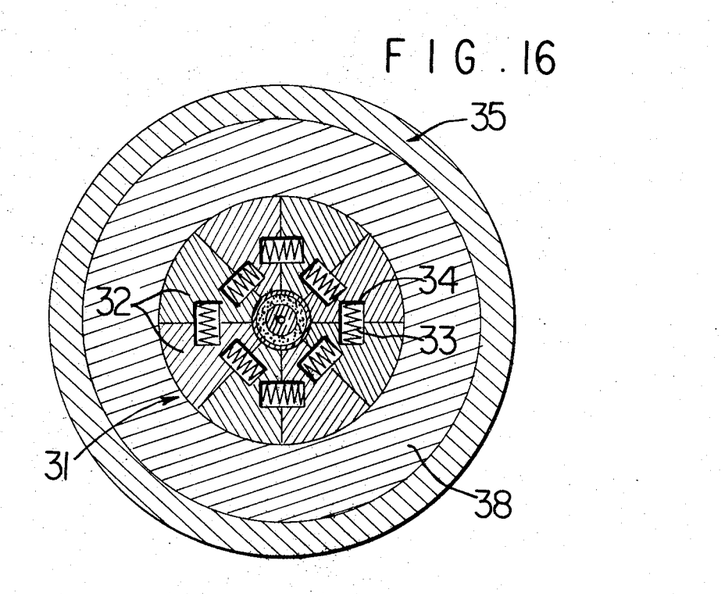
FIG. 16 is a section taken along the plane of line 16—16 of FIG. 15.

Referring to FIGS. 13-15 inclusive, reference character 31 denotes a split die ring member comprising eight individual sections 32 which are movable radially toward and away from each other being normally biased into relative spaced apart or separated position as by biasing springs 33 positioned in respective receiving holes 34 provided in the sectors as seen in FIG. 14. The upper surfaces of these sectors 32 abut the under face of the machine frame 35 in axial alignment with a hole 36 therein. These segments have arcuate inner axially extending surfaces that define a central variable diametered axial opening 37 whose defined diameter depends upon the relative positions of the sectors 32. The outer surface of the split die ring 31 has the form of a truncated cone which is axially fitted into a complementally shaped reciprocally movable confining member 38 that is maintained as by a threaded collar 39 into an annular threaded projection 40 extending downwardly from the frame 35 concentrically with the axis of hole 36. The upper surface of the confining member 38 is spaced normally from the under surface of frame 35 to permit reciprocal vertical motion of member 38. Upward movement of member 38 which acts as a wedge for the sectors 32 serves to move them together from their spaced relative positions of FIG. 14 to their closed positions seen in FIG. 16, such movement being effected in timely manner as will be described.

The cup 1$c$ similar to cup 1$b$ and containing a measured quantity of zinc or amalgamated zinc powder 5$c$ is positioned on the underlying push rod or piston 11$c$ located below and axially aligned with the central opening 37 defined by the sectors 32 in their separated or spaced-apart condition. Compressed air or fluid from a suitable source is introduced into channel 16$c$ of the mandrel 14$c$ as the latter moves into the cup 1$c$ which is being pushed upwardly into opening 37 by the upwardly moving push rod or piston 11$c$. At the same time, the plug 23$c$ is moved to introduce its machined lower end 25$c$ into the upper inturned open end 1'$c$ of cup 1$c$. During introduction of mandrel 14$c$ into cup 1$c$ the fluid or compressed air emerging from the bottom end of channel 16$c$ of mandrel 14$c$ agitates and drives the powder 5$c$ away from the bottom of cup 1$c$ and distributes it uniformly in the annular space A$c$ delimited by the inner side wall of cup 1$c$ and the surface of mandrel 14$c$ (FIG. 13). The contact between the upper rim of cup 1$c$ and the machined portion 25$c$ of plug 23$c$ is such that the compressed air or fluid can escape without escape of powder.

When the bottom end of mandrel 14$c$ reaches the bottom of cup 1$c$, the supply of fluid or compressed air is cut off in any suitable way. When push rod 11$c$ has elevated the cup 1$c$ to the position shown in FIGS. 13 and 15 at which time the full length of cup 1$c$ lies entirely within the expanded opening 37, the confining member 38 is driven upwardly in the direction of the arrow K of FIG. 15 and its tapered inner wall operates on the tapered outer surfaces of sectors 32 to drive them radially inward in direction of the arrows L of FIG. 15 to their closed condition shown in FIG. 16 causing reduction in diameter of the opening 37. In their inward movement, the inner arcuate walls of the respective sectors 32 engage corresponding areas of the longitudinal wall of cup 1$c$ and exert radial pressure thereon with consequent reduction of diameter of said cup 1$c$. This reduction in diameter of said cup 1$c$ from its initial dimensions results as in the earlier modes in compressing the active powder material 5$c$ in the annular space A$c$ and agglomerating it into a coherent annular mass adhering to the side wall of the reduced diametered cup 1$c$.

Thereafter, the confining member 38 is retracted in opposite direction to arrow K so that the sectors under actions of biasing springs 32 can move apart in direction of arrows L' (FIG. 13) to initial condition as seen in FIGS. 13 and 14. Then the piston or push rod 11$c$ can be lowered, lowering the reduced diametered cup 1$c$ from opening 37 and the mandrel 14$c$ as well as plug 23$b$ withdrawn from cup 1$c$. The resulting cup negative material assembly is similar to those of the mode of the earlier described figures and may be similarly utilized. As an illustrative but nonlimiting example, where the initial cup diameter is about 20 mm. and has a height of about 50 mm., the power required to move member 38 upwardly to effect a diametrical cup reduction of about 6% is about 4 tons.

After the cup-negative electrode mass assemblies have been prepared by any of the foregoing described modes of procedure, they may be assembled together with other cell components to complete the electrochemical generator or cell.

Figure 17:
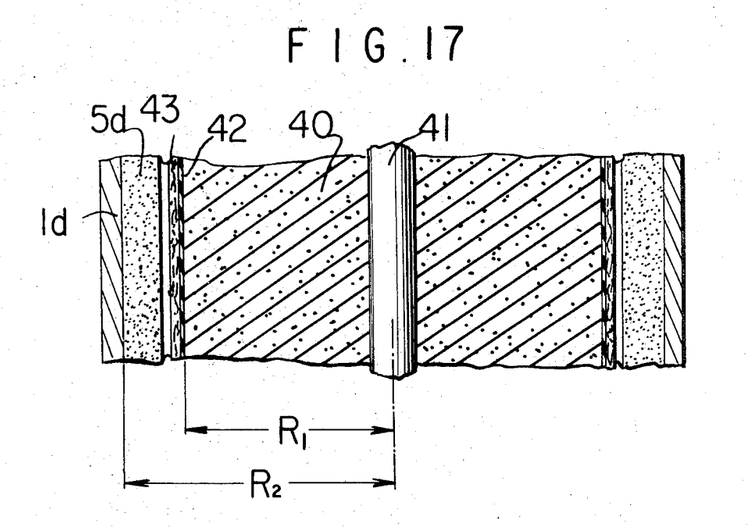
FIG. 17 is a partial cross section on an exaggerated scale of an alkaline cell whose cup-active material mass has been treated in one of the modes of this invention and assembled with its other components.
Figure 18:
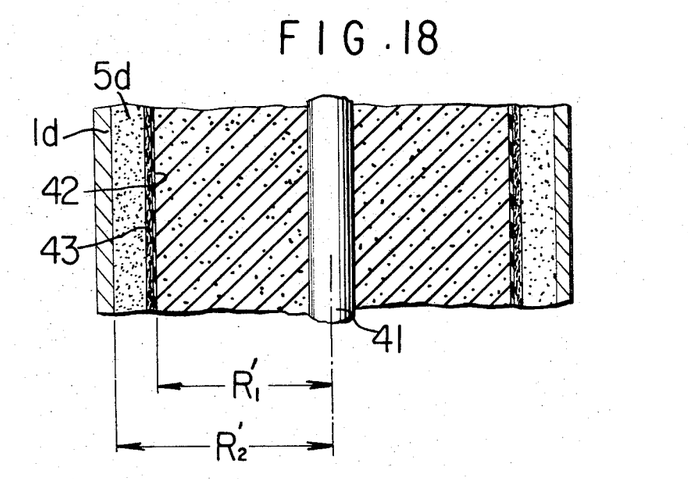
FIG. 18 is a similar view of the cell of FIG. 17 subsequent to final cold compression of the entire assembly.

This procedure is illustrated in FIGS. 17 and 18.

Referring first to FIG. 17, a cup-negative electrode assembly prepared according to any of the aforedescribed modes and including reduced diametered cup 1$d$ with the coherent agglomerated mass 5$d$ of zinc powder annulus adherent to its inner side wall has inserted into it a depolarizing agglomerate 40 of conventional type duly compressed and surrounding a central positive rod electrode 41 of carbon or the like. A separator 42 comprising, for example, a semipermeable body of regenerated cellulose (Cellophane) or polyvinyl alcohol and a porous body 43 of, for example, nonwoven fibers of plastic material such as polyamide surround the depolarizing agglomerate. The pack consisting of the rod 41, agglomerate 40 and separator components 42 and 43 is introduced into the cup-active negative electrode assembly 1$d$-5$d$ the external pack dimensions providing some clearance between it and the inner surface of coheret annular mass 5$d$ to facilitate its insertion.

Thereafter an appropriate amount of electrolyte, for example, a potassium hydroxide solution saturated with zinc oxide and also containing, if desired, a dissolved compound of mercury if the original powder 5$d$ was not originally amalgamated zinc is introduced into the cup 1$d$ to impregnate the separator and negative active material 5$d$. This impregnation may be accelerated and enhanced by use of vacuum in conventional ways.

The assembled cell with these components in place is then subjected to further final cold compression step, for example, in a die and in accord with the means and process described in U.S. Pat. No. 3,040117 and shown in FIG. 1 thereof. This final cold compression step effects a final reduction in diameter of the cup 1d from $R_2$ or FIG. 17 to $R'_2$ of FIG. 18, $R'_2$ being less than $R_2$ and results also in eliminating the clearance gap shown in FIG. 17 between the pack and coherent powder mass 5d thus bringing the negative zinc cup electrode 1d closer to the positive carbon electrode 41 and also further compressing the depolarizer agglomerate 40 from its original diameter $R_1$, FIG. 17 to the smaller diameter $R'_1$ of FIG. 18, thus resulting in a completed cell with substantially increased or enhanced electrochemical efficiency.

As an alternative the final cold compression just described may be effected in the manner disclosed in French Pat. No. 1,510,036 (no corresponding U.S. Pat.).

From the foregoing, it is clear that the procedures involved in this invention generally comprise providing a metallic cup of oversized diameter relative to its finally desired diameter, distributing powdered active material such as zinc or amalgamated zinc in an annular space defined between the inner wall of the cup and a mandrel, thereafter effecting diametrical reduction of the zinc cup to a desired extent by cold compression which serves also to compress the powder within the annular space into a coherent porous agglomerated mass that is adherent to the said inner wall of the cup, thereafter withdrawing the mandrel and incorporating the other required components into the aforesaid cup-mass assembly to complete the electrochemical generator or cell and subsequently by further cold compression effecting a further and final diametrical reduction of cup of the cell or generator and various of its internal components to enhance its electrochemical efficiency.

While specific modes or embodiments for practicing the invention have been described, variations within the scope of the appended claims are possible and are contemplated. There is no intention, therefore, of limitation to the exact abstract or disclosure herein presented.

What is claimed is:

1. That improvement in the manufacture of electrochemical generators comprising the steps of providing a metallic cup, forming an annular space therein between said cup and a mandrel, distributing powdered active material into said space, thereafter subjecting the metallic cup to cold compression to effect reduction in portions at least of its diameter with resultant compression in situ of the powdered active material in the annular space into a coherent, porous mass of active material adherent to the inner side wall of the reduced diameter cup, then withdrawing said mandrel leaving the resulting reduced diametered cup bearing said adherent coherent mass and constituting an electrode of given polarity for the generator.

2. That improvement in the manufacture of electrochemical generators according to claim 1, including the additional steps of assembling the reduced diametered cup bearing said adherent coherent mass with adjuvants including an opposite polarity electrode, depolarizing material, electrolyte and separator to form an electrochemical generator structure and subjecting such structure to further cold compression and diametered reduction of its cup and contents to enhance the efficiency of the electrochemical generator.

3. That improvement in the manufacture of electrochemical generators according to claim 1, wherein said cold compression of said cup is effected by movement of the cup through a constricting orifice of a reducing die.

4. That improvement in the manufacture of electrochemical generators according to claim 1, wherein said cold compression of said cup is effected by exerting uniform radially directed compression to said cup.

5. That improvement in the manufacture of electrochemical generators according to claim 4, wherein said radially directed compression is constant and uniformly distributed.

6. That improvement in the manufacture of electrochemical generators according to claim 1, wherein said cold compression of said cup is effected by radially directed compression to selected external zones of said cup.

7. That improvement in the manufacture of electrochemical generators according to claim 6, wherein said radially directed compression is effected along a length of the longitudinal wall of said cup.

8. That improvement in the manufacture of electrochemical generators according to claim 6, wherein said radially directed compression is applied simultaneously to said selected external zones of said cup.

9. That improvement in the manufacture of electrochemical generators according to claim 1, wherein distribution of said powdered active material into said space is effected subsequent to introduction of the mandrel into said cup.

10. That improvement in the manufacture of electrochemical generators according to claim 1, wherein a selected quantity of said powdered active material is positioned in said cup, thereafter said mandrel is moved into said cup and during such movement forms said annular space, and also effecting turbulence of the powdered active material during such mandrel movement to distribute the material into the annular space as the latter is formed.

11. That improvement in the manufacture of electrochemical generators according to claim 10 wherein said turbulence is effected by direction of compressed fluid against the powdered active material in said cup to drive it into and distribute it in said annular space.

12. That improvement in the manufacture of electrochemical generators according to claim 11 including closing off the open end of said cup and annular space during said turbulence sufficiently to prevent escape of powdered active material driven into said annular space while permitting venting of the compressed fluid therefrom.

13. That improvement in the manufacture of electrochemical generators according to claim 12 wherein the said closing off is controlled and selected so as to limit available height in the cup of the annular space into which said powdered active material can be driven by said turbulence.

14. That improvement in the manufacture of electrochemical generators according to claim 1, including the additional step of assembling the reduced diametered cup bearing said adherent coherent mass with adjuvants including an opposite polarity electrode, depolarizer material, electrolyte and separator to form an electrochemical generator structure, said mandrel having larger diameter than that of the adjuvants to provide a clearance upon its removal to thereby facilitate assembling and positioning of the adjuvants within the cup bearing said adherent coherent mass.

15. That improvement in the manufacture of electrochemical generators according to claim 14 including the further step of final cold compression of the entire assembly subsequent to said additional step of assembling to enhance the operational efficiency of the resultant completed electrochemical generator.

References Cited

UNITED STATES PATENTS

| | | | |
|---|---|---|---|
| 2,481,539 | 9/1949 | Ruben | 136—175 |
| 3,040,117 | 6/1962 | Jammet | 136—175 |
| 3,051,769 | 8/1962 | Jammet | 136—175X |
| 3,178,314 | 4/1965 | Horn et al. | 136—175X |
| 3,196,051 | 7/1965 | Balaguer | 136—175 |
| 3,432,351 | 3/1969 | Davee et al. | 29—420X |

FOREIGN PATENTS 1,510,036    1/1968    France.

JOHN F. CAMPBELL, Primary Examiner

D. C. REILEY, Assistant Examiner

U.S. Cl. X.R.

29—420